(12) United States Patent
Washizu

(10) Patent No.: US 11,549,007 B2
(45) Date of Patent: Jan. 10, 2023

(54) COPOLYMER, RUBBER COMPOSITION, AND TIRE

(71) Applicant: SUMITOMO RUBBER INDUSTRIES, LTD., Hyogo (JP)

(72) Inventor: Kensuke Washizu, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 239 days.

(21) Appl. No.: 17/136,378

(22) Filed: Dec. 29, 2020

(65) Prior Publication Data

US 2021/0230416 A1 Jul. 29, 2021

(30) Foreign Application Priority Data

Jan. 27, 2020 (JP) .............................. JP2020-010865

(51) Int. Cl.
 *C08L 25/10* (2006.01)
 *C08L 25/18* (2006.01)
 *C08K 3/36* (2006.01)
 *B60C 1/00* (2006.01)

(52) U.S. Cl.
 CPC ............ *C08L 25/10* (2013.01); *B60C 1/0016* (2013.01); *C08K 3/36* (2013.01); *C08L 25/18* (2013.01); *C08L 2205/03* (2013.01)

(58) Field of Classification Search
 CPC ............ C08L 25/10; C08L 25/18; C08K 3/36
 USPC ....................................................... 523/156
 See application file for complete search history.

(56) References Cited

U.S. PATENT DOCUMENTS 3,387,057 A 6/1968 Neuworth et al.
3,931,107 A 1/1976 Trepka

FOREIGN PATENT DOCUMENTS

JP 2011-063714 * 3/2011
JP 5288278 9/2013

* cited by examiner

*Primary Examiner* — Deve V Hall

(74) *Attorney, Agent, or Firm* — Greenblum & Bernstein, P.L.C.

(57) ABSTRACT

Provided are copolymers which provide improved overall performance in terms of fuel economy and wet grip performance, as well as rubber compositions and tires containing the copolymers. Included is a copolymer obtained by copolymerizing an aromatic vinyl compound, a conjugated diene compound, and a compound represented by the formula (1) below or by copolymerizing a conjugated diene compound and a compound represented by the formula (1) below, the copolymer having a weight average molecular weight of $1.0 \times 10^3$ to $2.5 \times 10^6$, (1)

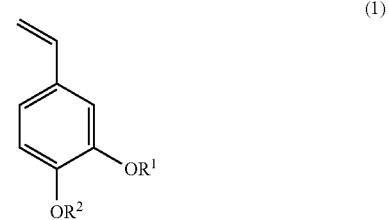

wherein $R^1$ and $R^2$ may be the same or different and each represents a functional group containing at least two selected from the group consisting of carbon, hydrogen, and silicon, and $R^1$ and $R^2$ may be joined together to form a ring structure.

8 Claims, No Drawings

COPOLYMER, RUBBER COMPOSITION, AND TIRE

TECHNICAL FIELD

The present invention relates to copolymers, rubber compositions, and tires.

BACKGROUND ART

Both fuel economy and wet grip performance are required as properties of tire tread rubbers. However, these properties usually have a trade-off relationship, and it is difficult to achieve both properties simultaneously.

It has been proposed to improve overall performance in terms of fuel economy and wet grip performance by using silica. However, silica is difficult to disperse uniformly in rubber. Thus, the technique leaves room for improvement in terms of processability.

Moreover, Patent Literature 1 discloses that a copolymer of styrene, 1,3-butadiene, and a specific alkoxystyrene may be used to prepare a rubber composition having an excellent balance between fuel economy and wet grip performance. However, in recent years it has become desirable to further improve overall performance in terms of fuel economy and wet grip performance.

CITATION LIST

Patent Literature

Patent Literature 1: JP 5288278 B

SUMMARY OF INVENTION

Technical Problem

The present invention aims to solve the above problem and provide copolymers which provide improved overall performance in terms of fuel economy and wet grip performance, as well as rubber compositions and tires containing the copolymers.

Solution to Problem

The present invention relates to a copolymer, obtained by copolymerizing an aromatic vinyl compound, a conjugated diene compound, and a compound represented by the formula (1) below or by copolymerizing a conjugated diene compound and a compound represented by the formula (1) below, the copolymer having a weight average molecular weight of $1.0 \times 10^3$ to $2.5 \times 10^6$,

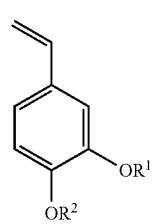

(1)

wherein $R^1$ and $R^2$ may be the same or different and each represents a functional group containing at least two selected from the group consisting of carbon, hydrogen, and silicon, and $R^1$ and $R^2$ may be joined together to form a ring structure.

The copolymer preferably contains 0.05 to 35% by mass of a component derived from the compound of formula (1).

The copolymer preferably contains 5 to 55% by mass of a component derived from the aromatic vinyl compound.

The copolymer preferably contains 40 to 90% by mass of a component derived from the conjugated diene compound.

Another aspect of the present invention relates to a rubber composition, containing the copolymer.

The rubber composition preferably contains, based on 100% by mass of a rubber component therein, 5% by mass or more of the copolymer.

The rubber composition preferably contains, per 100 parts by mass of a rubber component therein, 5 to 150 parts by mass of silica.

Another aspect of the present invention relates to a tire, including a tire component including the rubber composition.

Advantageous Effects of Invention

The copolymers of the present invention are obtained by copolymerizing an aromatic vinyl compound, a conjugated diene compound, and a compound of formula (1) or by copolymerizing a conjugated diene compound and a compound of formula (1), and further have a weight average molecular weight of $1.0 \times 10^3$ to $2.5 \times 10^6$. Such copolymers provide excellent fuel economy and wet grip performance.

DESCRIPTION OF EMBODIMENTS

The copolymers of the present invention are obtained by copolymerizing an aromatic vinyl compound, a conjugated diene compound, and a compound of formula (1) or by copolymerizing a copolymer of a conjugated diene compound and a compound of formula (1). Further, the copolymers have a weight average molecular weight of $1.0 \times 10^3$ to $2.5 \times 10^6$.

Rubbers may usually irreversibly covalently bond to silica via silane coupling agents. In contrast, the above-specified copolymers may form reversible bonds, such as hydrogen bonds, between the oxygen atoms in the compound of formula (1) and the hydroxy groups on the surface of silica. It is believed that this facilitates dispersion of silica, so that the overall performance in terms of fuel economy and wet grip performance can be improved.

Although it is considered that the copolymer disclosed in Patent Literature 1 can also form reversible bonds with silica, it is believed the specified copolymers may have a larger number of sites forming reversible bonds than the copolymer of Patent Literature 1, so that the overall performance in terms of fuel economy and wet grip performance can be significantly improved.

The specified copolymers are obtained by copolymerizing at least an aromatic vinyl compound, a conjugated diene compound, and a compound represented by the formula (1) below or by copolymerizing at least a conjugated diene compound and a compound represented by the formula (1) below. Specifically, examples of the copolymers include terpolymers containing a structural unit derived from an aromatic vinyl compound, a structural unit derived from a conjugated diene compound, and a structural unit derived from a compound of formula (1), and bipolymers containing a structural unit derived from a conjugated diene compound and a structural unit derived from a compound of formula (1). These may be used alone or in combinations of two or more. Preferred among these are terpolymers containing a structural unit derived from an aromatic vinyl compound, a structural unit derived from a conjugated diene compound, and a structural unit derived from a compound of formula (1).

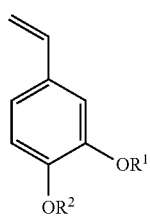

In formula (1), $R^1$ and $R^2$ may be the same or different and each represents a functional group containing at least two selected from the group consisting of carbon, hydrogen, and silicon, and $R^1$ and $R^2$ may be joined together to form a ring structure.

Examples of the aromatic vinyl compound include styrene, α-methylstyrene, 1-vinylnaphthalene, 3-vinyltoluene, ethylvinylbenzene, divinylbenzene, 4-cyclohexylstyrene, and 2,4,6-trimethylstyrene. These may be used alone or in combinations of two or more. Preferred among these are styrene and α-methylstyrene, with styrene being more preferred. It should be noted that the aromatic vinyl compound does not include the compound of formula (1).

The amount of the component derived from the aromatic vinyl compound (the structural unit derived from the aromatic vinyl compound) based on 100% by mass of the copolymer is preferably 5% by mass or more, more preferably 12% by mass or more, still more preferably 19% by mass or more, but is preferably 55% by mass or less, more preferably 30% by mass or less, still more preferably 25% by mass or less. When the amount is within the range indicated above, the advantageous effect tends to be better achieved.

Examples of the conjugated diene compound include 1,3-butadiene, isoprene, 1,3-pentadiene, 2,3-dimethylbutadiene, 2-phenyl-1,3-butadiene, and 1,3-hexadiene. These may be used alone or in combinations of two or more. Preferred among these are 1,3-butadiene and isoprene, with 1,3-butadiene being more preferred.

The amount of the component derived from the conjugated diene compound (the structural unit derived from the conjugated diene compound) based on 100% by mass of the copolymer is preferably 40% by mass or more, more preferably 45% by mass or more, still more preferably 50% by mass or more, but is preferably 90% by mass or less, more preferably 85% by mass or less, still more preferably 80% by mass or less. When the amount is within the range indicated above, the advantageous effect tends to be better achieved.

In formula (1), $R^1$ and $R^2$ each represent a functional group containing at least two selected from the group consisting of carbon, hydrogen, and silicon. Examples include hydrocarbon-based functional groups (functional groups containing carbon and hydrogen) such as methyl and ethyl groups which may be used as phenol-protecting groups, and silicon-based functional groups (functional groups containing carbon, hydrogen, and silicon) such as trimethylsilyl and triethoxysilyl groups. Preferred among these are hydrocarbon-based functional groups, preferably alkyl groups. The number of carbon atoms in the alkyl groups is preferably 1 to 6, more preferably 1 to 4, still more preferably 1 to 2.

Moreover, $R^1$ and $R^2$ may be the same or different, preferably the same.

Specific examples of the compound of formula (1) include 3,4-dimethoxystyrene, 5-ethenylbenzo[1,3]dioxane, 6-vinyl-2,3-dihydro-1,4-benzodioxane, 4-ethenyl-1,2-bis[(trimethylsilyl)oxy]benzene, 3,4-dihydroxystyrene, and 4-ethenyl-1-(trimethylsilyl)oxy-2-methoxy-benzene. These may be used alone or in combinations of two or more. Preferred among these are 3,4-dimethoxystyrene, 4-ethenyl-1,2-bis[(trimethylsilyl)oxy]benzene, 3,4-dihydroxystyrene, and 4-ethenyl-1-(trimethylsilyl)oxy-2-methoxy-benzene, with 3,4-dimethoxystyrene being more preferred.

The amount of the component derived from the compound of formula (1) (the structural unit derived from the compound of formula (1)) based on 100% by mass of the copolymer is preferably 0.05% by mass or more, more preferably 1% by mass or more, still more preferably 1.5% by mass or more, from the standpoints of fuel economy and wet grip performance. The amount is also preferably 35% by mass or less, more preferably 30% by mass or less, still more preferably 25% by mass or less, from the standpoint of cost.

The copolymers may have any weight average molecular weight (Mw) of $1.0 \times 10^3$ to $2.5 \times 10^6$. The Mw is preferably $1.0 \times 10^5$ or higher, more preferably $3.5 \times 10^5$ or higher, still more preferably $4.5 \times 10^5$ or higher, particularly preferably $4.7 \times 10^5$ or higher, from the standpoint of fuel economy. The Mw is also preferably $1.5 \times 10^6$ or lower, more preferably $1.0 \times 10^6$ or lower, still more preferably $8.0 \times 10^5$ or lower, particularly preferably $6.0 \times 10^5$ or lower, from the standpoint of processability.

The weight average molecular weight (Mw) can be determined by gel permeation chromatography (GPC) (GPC-8000 series available from Tosoh Corporation, detector: differential refractometer, column: TSKGEL SUPERMULTIPORE HZ-M available from Tosoh Corporation) calibrated with polystyrene standards.

The copolymers may be obtained by any polymerization method, including solution polymerization, vapor phase polymerization, and bulk polymerization. Solution polymerization is preferred from the standpoint of safety.

The polymerization may be carried out either in a batch mode or in a continuous mode.

The rubber compositions of the present invention contain a rubber component including any of the specified copolymers.

The amount of the copolymer based on 100% by mass of the rubber component is preferably 5% by mass or more, more preferably 20% by mass or more, still more preferably 40% by mass or more, particularly preferably 45% by mass or more, but is preferably 85% by mass or less, more preferably 75% by mass or less, still more preferably 70% by mass or less. When the amount is within the range indicated above, the advantageous effect tends to be better achieved.

In addition to the copolymer, the rubber component may preferably include a diene rubber.

Examples of the diene rubber include natural rubber (NR) and synthetic diene rubbers such as polyisoprene rubber (IR), polybutadiene rubber (BR), styrene-butadiene rubber (SBR), acrylonitrile-butadiene rubber (NBR), chloroprene rubber (CR), and butyl rubber (IIR). These may be used alone or in combinations of two or more. From the standpoint of overall performance in terms of fuel economy and wet grip performance, NR, SBR, and BR are preferred among these, with NR or BR being more preferred.

The amount of NR based on 100% by mass of the rubber component is preferably 5% by mass or more, more preferably 10% by mass or more, still more preferably 20% by mass or more, but is preferably 50% by mass or less, more preferably 40% by mass or less, still more preferably 30% by mass or less. When the amount is within the range indicated above, the advantageous effect tends to be better achieved.

The amount of SBR based on 100% by mass of the rubber component is preferably 1% by mass or more, more preferably 5% by mass or more, but is preferably 50% by mass or less, more preferably 35% by mass or less, still more preferably 20% by mass or less, particularly preferably 15% by mass or less. When the amount is within the range indicated above, the advantageous effect tends to be better achieved.

The amount of BR based on 100% by mass of the rubber component is preferably 5% by mass or more, more preferably 10% by mass or more, but is preferably 40% by mass or less, more preferably 30% by mass or less, still more preferably 20% by mass or less. When the amount is within the range indicated above, the advantageous effect tends to be better achieved.

A functional group interactive with filler such as silica may be introduced into the rubber component by modification.

Examples of the functional group include amino, amide, silyl, alkoxysilyl, isocyanate, imino, imidazole, urea, ether, carbonyl, oxycarbonyl, mercapto, sulfide, disulfide, sulfonyl, sulfinyl, thiocarbonyl, ammonium, imide, hydrazo, azo, diazo, carboxyl, nitrile, pyridyl, alkoxy, hydroxy, oxy, and epoxy groups. These functional groups may be substituted. Preferred among these are amino groups (preferably amino groups whose hydrogen atom is replaced with a C1-C6 alkyl group), alkoxy groups (preferably C1-C6 alkoxy groups), and alkoxysilyl groups (preferably C1-C6 alkoxysilyl groups).

Specific examples of compounds (modifiers) containing the functional groups include 2-dimethylaminoethyltrimethoxysilane, 3-dimethylaminopropyltrimethoxysilane, 2-dimethylaminoethyltriethoxysilane, 3-dimethylaminopropyltriethoxysilane, 2-diethylaminoethyltrimethoxysilane, 3-diethylaminopropyltrimethoxysilane, 2-diethylaminoethyltriethoxysilane, and 3-diethylaminopropyltriethoxysilane.

The rubber compositions preferably contain silica as a reinforcing agent.

Examples of the silica include dry silica (anhydrous silicic acid) and wet silica (hydrous silicic acid). Wet silica is preferred because it has a large number of silanol groups. Commercial products available from Evonik, Tosoh Silica Corporation, Solvay Japan, Tokuyama Corporation, etc. may be used. These may be used alone or in combinations of two or more.

The silica preferably has a nitrogen adsorption specific surface area ($N_2SA$) of 50 $m^2/g$ or more, more preferably 80 $m^2/g$ or more, still more preferably 150 $m^2/g$ or more, particularly preferably 180 $m^2/g$ or more, from the standpoint of reinforcement. The $N_2SA$ is also preferably 300 $m^2/g$ or less, more preferably 250 $m^2/g$ or less, still more preferably 200 $m^2/g$ or less, from the standpoint of dispersion.

The nitrogen adsorption specific surface area of the silica is measured by the BET method in accordance with ASTM D3037-81.

The amount of the silica per 100 parts by mass of the rubber component is preferably 5 parts by mass or more, more preferably 10 parts by mass or more, still more preferably 45 parts by mass or more, particularly preferably 60 parts by mass or more, from the standpoint of reinforcement. The amount is also preferably 150 parts by mass or less, more preferably 100 parts by mass or less, still more preferably 70 parts by mass or less, from the standpoint of processability.

Preferably, the silica is used with a silane coupling agent.

Any silane coupling agent may be used, and examples include sulfide silane coupling agents such as 3-trimethoxysilylpropylbenzothiazolyl tetrasulfide, bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(2-triethoxysilylethyl)trisulfide, bis(4-trimethoxysilylbutyl)trisulfide, bis(3-triethoxysilylpropyl)disulfide, bis(2-triethoxysilylethyl)disulfide, bis(4-triethoxysilylbutyl)disulfide, bis(3-trimethoxysilylpropyl)disulfide, bis(2-trimethoxysilylethyl)disulfide, bis(4-trimethoxysilylbutyl)disulfide, 3-trimethoxysilylpropyl-N,N-dimethylthiocarbamoyl tetrasulfide, 2-triethoxysilylethyl-N,N-dimethylthiocarbamoyl tetrasulfide, and 3-triethoxysilylpropyl methacrylate monosulfide; mercapto silane coupling agents such as 3-mercaptopropyltrimethoxysilane, 2-mercaptoethyltriethoxysilane, and NXT and NXT-Z both available from Momentive; vinyl silane coupling agents such as vinyltriethoxysilane and vinyltrimethoxysilane; amino silane coupling agents such as 3-aminopropyltriethoxysilane and 3-aminopropyltrimethoxysilane; glycidoxy silane coupling agents such as Y-glycidoxypropyltriethoxysilane and Y-glycidoxypropyltrimethoxysilane; nitro silane coupling agents such as 3-nitropropyltrimethoxysilane and 3-nitropropyltriethoxysilane; and chloro silane coupling agents such as 3-chloropropyltrimethoxysilane and 3-chloropropyltriethoxysilane. Commercial products available from Evonik, Momentive, Shin-Etsu Silicone, Tokyo Chemical Industry Co., Ltd., AZmax. Co., Dow Corning Toray Co., Ltd., etc. may be used. These may be used alone or in combinations of two or more. From the standpoint of the reinforcement-improving effect, sulfide silane coupling agents are preferred among these, with bis(3-triethoxysilylpropyl) tetrasulfide and 3-trimethoxysilylpropylbenzothiazolyl tetrasulfide being more preferred, with bis(3-triethoxysilylpropyl)tetrasulfide being still more preferred.

The amount of the silane coupling agent per 100 parts by mass of the silica is preferably 1 part by mass or more, more preferably 2 parts by mass or more, still more preferably 5 parts by mass or more, from the standpoint of processability. The amount is also preferably 20 parts by mass or less, more preferably 15 parts by mass or less, still more preferably 10 parts by mass or less, from the standpoint of cost.

The rubber compositions may contain carbon black as a reinforcing agent.

Any carbon black may be used, and examples include N134, N110, N220, N234, N219, N339, N330, N326, N351, N550, and N762. Commercial products available from Asahi Carbon Co., Ltd., Cabot Japan K.K., Tokai Carbon Co., Ltd., Mitsubishi Chemical Corporation, Lion Corporation, NSCC Carbon Co., Ltd, Columbia Carbon, etc. may be used. These may be used alone or in combinations of two or more.

The carbon black preferably has a nitrogen adsorption specific surface area ($N_2SA$) of 80 $m^2/g$ or more, more preferably 100 $m^2/g$ or more, but preferably 160 $m^2/g$ or less, more preferably 140 m²/g or less. When the $N_2SA$ is within the range indicated above, the advantageous effect tends to be better achieved.

The $N_2SA$ of the carbon black is measured in accordance with JIS K6217-2:2001.

The amount of the carbon black per 100 parts by mass of the rubber component is preferably 1 part by mass or more, more preferably 3 parts by mass or more, still more preferably 5 parts by mass or more, but is preferably 30 parts by mass or less, more preferably 20 parts by mass or less, still more preferably 10 parts by mass or less. When the amount is within the range indicated above, the advantageous effect tends to be better achieved.

The rubber compositions may contain a resin.

Examples of the resin include coumarone-indene resins, styrene resins, terpene resins, C5/C9 resins, and phenol resins. Commercial products available from Maruzen Petrochemical Co., Ltd., Sumitomo Bakelite Co., Ltd., Yasuhara Chemical Co., Ltd., Tosoh Corporation, Rutgers Chemicals, BASF, Arizona Chemical, Nitto Chemical Co., Ltd., Nippon Shokubai Co., Ltd., ENEOS Corporation, Arakawa Chemical Industries, Ltd., Taoka Chemical Co., Ltd., Exxon Mobil Corporation, etc. may be used. These may be used alone or in combinations of two or more.

The amount of the resin per 100 parts by mass of the rubber component is preferably 1 part by mass or more, more preferably 3 parts by mass or more, still more preferably 5 parts by mass or more, but is preferably 25 parts by mass or less, more preferably 20 parts by mass or less, still more preferably 15 parts by mass or less. When the amount is within the range indicated above, the advantageous effect tends to be better achieved.

The rubber compositions may contain an antioxidant.

Examples of the antioxidant include naphthylamine antioxidants such as phenyl-α-naphthylamine; diphenylamine antioxidants such as octylated diphenylamine and 4,4'-bis (α,α'-dimethylbenzyl)diphenylamine; p-phenylenediamine antioxidants such as N-isopropyl-N'-phenyl-p-phenylenediamine, N-(1,3-dimethylbutyl)-N'-phenyl-p-phenylenediamine, and N,N'-di-2-naphthyl-p-phenylenediamine; quinoline antioxidants such as 2,2,4-trimethyl-1,2-dihydroquinoline polymer; monophenolic antioxidants such as 2,6-di-t-butyl-4-methylphenol and styrenated phenol; and bis-, tris-, or polyphenolic antioxidants such as tetrakis [methylene-3-(3',5'-di-t-butyl-4'-hydroxyphenyl)propionate]methane. Commercial products available from Seiko Chemical Co., Ltd., Sumitomo Chemical Co., Ltd., Ouchi Shinko Chemical Industrial Co., Ltd., Flexsys, etc. may be used. These may be used alone or in combinations of two or more.

The amount of the antioxidant per 100 parts by mass of the rubber component is preferably 0.5 parts by mass or more, more preferably 1 part by mass or more, but is preferably 6 parts by mass or less, more preferably 4 parts by mass or less. When the amount is within the range indicated above, the advantageous effect tends to be better achieved.

The rubber compositions may contain an oil.

Examples of the oil include process oils, plant oils, and mixtures thereof. Examples of the process oils include paraffinic process oils, aromatic process oils, and naphthenic process oils. Examples of the plant oils include castor oil, cotton seed oil, linseed oil, rapeseed oil, soybean oil, palm oil, coconut oil, peanut oil, rosin, pine oil, pine tar, tall oil, corn oil, rice oil, safflower oil, sesame oil, olive oil, sunflower oil, palm kernel oil, *camellia* oil, jojoba oil, macadamia nut oil, and tung oil. Commercial products available from Idemitsu Kosan Co., Ltd., Sankyo Yuka Kogyo K.K., ENEOS Corporation, Olisoy, H&R, Hokoku Corporation, Showa Shell Sekiyu K.K., Fuji Kosan Co., Ltd., etc. may be used. These may be used alone or in combinations of two or more.

The amount of the oil per 100 parts by mass of the rubber component is preferably 5 parts by mass or more, more preferably 10 parts by mass or more, but is preferably 100 parts by mass or less, more preferably 50 parts by mass or less, still more preferably 30 pats by mass or less. When the amount is within the range indicated above, the advantageous effect tends to be better achieved.

The rubber compositions may contain a wax.

Any wax may be used, and examples include petroleum waxes such as paraffin waxes and microcrystalline waxes; naturally-occurring waxes such as plant waxes and animal waxes; and synthetic waxes such as polymers of ethylene, propylene, or other similar monomers. Commercial products available from Ouchi Shinko Chemical Industrial Co., Ltd., Nippon Seiro Co., Ltd., Seiko Chemical Co., Ltd., etc. may be used. These may be used alone or in combinations of two or more.

The amount of the wax per 100 parts by mass of the rubber component is preferably 0.5 parts by mass or more, more preferably 1 part by mass or more, but is preferably 5 parts by mass or less, more preferably 3 parts by mass or less. When the amount is within the range indicated above, the advantageous effect tends to be better achieved.

The rubber compositions may contain stearic acid.

The stearic acid may be a conventional one, e.g., commercially available from NOF Corporation, Kao Corporation, FUJIFILM Wako Pure Chemical Corporation, or Chiba Fatty Acid Co., Ltd. These may be used alone or in combinations of two or more.

The amount of the stearic acid per 100 parts by mass of the rubber component is preferably 1 part by mass or more, more preferably 2 parts by mass or more, but is preferably 10 parts by mass or less, more preferably 6 parts by mass or less. When the amount is within the range indicated above, the advantageous effect tends to be better achieved.

The rubber compositions may contain zinc oxide.

The zinc oxide may be a conventional one, e.g., commercially available from Mitsui Mining & Smelting Co., Ltd., Toho Zinc Co., Ltd., HakusuiTech Co., Ltd., Seido Chemical Industry Co., Ltd., or Sakai Chemical Industry Co., Ltd. These may be used alone or in combinations of two or more.

The amount of the zinc oxide per 100 parts by mass of the rubber component is preferably 1 part by mass or more, more preferably 3 parts by mass or more, but is preferably 10 parts by mass or less, more preferably 6 parts by mass or less. When the amount is within the range indicated above, the advantageous effect tends to be better achieved.

The rubber compositions may contain sulfur.

Examples of the sulfur include those commonly used in the rubber industry, such as powdered sulfur, precipitated sulfur, colloidal sulfur, insoluble sulfur, highly dispersible sulfur, and soluble sulfur. Commercial products available from Tsurumi Chemical Industry Co., Ltd., Karuizawa Sulfur Co., Ltd., Shikoku Chemicals Corporation, Flexsys, Nippon Kanryu Industry Co., Ltd., Hosoi Chemical Industry Co., Ltd., etc. may be used. These may be used alone or in combinations of two or more.

The amount of the sulfur per 100 parts by mass of the rubber component is preferably 0.5 parts by mass or more, more preferably 1.5 parts by mass or more, but is preferably 6 parts by mass or less, more preferably 3 parts by mass or less. When the amount is within the range indicated above, the advantageous effect tends to be better achieved.

The rubber compositions may contain a vulcanization accelerator.

Examples of the vulcanization accelerator include thiazole vulcanization accelerators such as 2-mercaptobenzothiazole and di-2-benzothiazolyl disulfide; thiuram vulcanization accelerators such as tetramethylthiuram disulfide (TMTD), tetrabenzylthiuram disulfide (TBzTD), and tetrakis(2-ethylhexyl)thiuram disulfide (TOT-N); sulfenamide vulcanization accelerators such as N-cyclohexyl-2-benzothiazylsulfenamide (CBS), N-tert-butyl-2-benzothiazolylsulfenamide (TBBS), N-oxyethylene-2-benzothiazole sulfenamide, and N,N'-diisopropyl-2-benzothiazole sulfenamide; and guanidine vulcanization accelerators such as diphenylguanidine, diorthotolylguanidine, and orthotolylbiguanidine. Commercial products available from Sumitomo Chemical Co., Ltd., Ouchi Shinko Chemical Industrial Co., Ltd., etc. may be used. These may be used alone or in combinations of two or more.

The amount of the vulcanization accelerator per 100 parts by mass of the rubber component is preferably 0.5 parts by mass or more, more preferably 1.5 parts by mass or more, but is preferably 6 parts by mass or less, more preferably 3 parts by mass or less. When the amount is within the range indicated above, the advantageous effect tends to be better achieved.

In addition to the above-mentioned components, the rubber compositions may contain other additives commonly used in the tire industry, such as organic peroxides, and fillers such as calcium carbonate, talc, alumina, clay, aluminum hydroxide, and mica. The amount of each of these additives per 100 parts by mass of the rubber component is preferably 0.1 to 200 parts by mass.

The rubber compositions may be prepared, for example, by kneading the components in a rubber kneading machine such as an open roll mill or Banbury mixer, and vulcanizing the kneaded mixture.

The kneading conditions are as follows: in a base kneading step of kneading additives other than vulcanizing agents and vulcanization accelerators, the kneading temperature is usually 100 to 180° C., preferably 120 to 170° C., while in a final kneading step of kneading vulcanizing agents and vulcanization accelerators, the kneading temperature is usually 120° C. or lower, preferably 85 to 110° C. The composition obtained by kneading vulcanizing agents and vulcanization accelerators is usually vulcanized by press vulcanization, for example. The vulcanization temperature is usually 140 to 190° C., preferably 150 to 185° C. The vulcanization time is usually 5 to 15 minutes.

The rubber compositions may be used in tire components (i.e., as rubber compositions for tires) such as treads (cap treads), sidewalls, base treads, undertreads, shoulders, clinches, bead apexes, breaker cushion rubbers, rubbers for carcass cord topping, insulations, chafers, and innerliners, and side reinforcement layers of run-flat tires. The rubber compositions are suitable for treads among others.

The tires of the present invention can be produced from the above-described rubber compositions by usual methods.

Specifically, the unvulcanized rubber compositions may each be extruded into the shape of a tire component such as a tread and then assembled with other tire components on a tire building machine in a usual manner to build an unvulcanized tire, which may then be heated and pressurized in a vulcanizer to produce a tire.

The tires include a tire component (e.g., tread) which at least partially includes any of the rubber compositions. The entire tire component may include any of the rubber compositions.

The tires (pneumatic tires, etc.) may be used as: tires for passenger cars; tires for trucks and buses; tires for two-wheeled vehicles; high performance tires; winter tires such as studless winter tires and cold weather tires; run-flat tires provided with side reinforcing layers; noise absorber-equipped tires which include a noise absorber such as sponge on the tire inner cavity; sealant tires which include a sealant capable of sealing punctures either inside the tire or on the tire inner cavity; electronic component-equipped tires which include an electronic component such as a sensor or a radio tag either inside the tire or on the tire inner cavity, etc. The tires are suitable for passenger cars.

EXAMPLES

The present invention is concretely described below with reference to, but not limited to, examples.

The chemicals used in the synthesis of copolymers are described below.

n-Hexane: a product of Kanto Chemical Co., Inc.
Styrene: a product of Kanto Chemical Co., Inc.
1,3-Butadiene: a product of Tokyo Chemical Industry Co., Ltd.
p-(t-Butoxy)styrene: a product of FUJIFILM Wako Pure Chemical Corporation
3,4-Dimethoxystyrene: a product of Sigma-Aldrich
4-Ethenyl-1,2-bis[(trimethylsilyl)oxy]benzene: a synthetic product
3,4-Dihydroxystyrene: a product of FUJIFILM Wako Pure Chemical Corporation
4-Ethenyl-1-(trimethylsilyl)oxy-2-methoxy-benzene: a synthetic product
Tetramethylethylenediamine: a product of Kanto Chemical Co., Inc.
n-Butyllithium: a 1.6 M n-butyllithium hexane solution available from Kanto Chemical Co., Inc.
Alcohol: methanol available from Kanto Chemical Co., Inc.
2,6-tert-Butyl-p-cresol: Nocrac 200 available from Ouchi Shinko Chemical Industrial Co., Ltd.
<Measurement and Identification>
(Measurement of weight average molecular weight)

The weight average molecular weight (Mw) was determined by a GPC-8000 series apparatus available from Tosoh Corporation using a differential refractometer as a detector. The molecular weight was calibrated with polystyrene standards.
(Structural identification of copolymer)

The structural identification of the copolymers was carried out using a JNM-ECA series apparatus available from JEOL Ltd.
<Synthesis of Copolymer>
(Copolymer (1))

Into a sufficiently nitrogen-purged heat-resistant vessel were charged 1500 mL of n-hexane, 100 mmol of styrene, 800 mmol of 1,3-butadiene, 1 mmol of p-(t-butoxy)styrene, 0.2 mmol of tetramethylethylenediamine, and 0.12 mmol of n-butyllithium, followed by stirring at 0° C. for 48 hours. Subsequently, the reaction was terminated by addition of the alcohol. Then, 1 g of 2,6-tert-butyl-p-cresol was added to the reaction solution, and the resulting solution was purified by reprecipitation to obtain copolymer (1). The copolymer had a Mw of 480,000 and contained 0.1 mol % (0.33% by mass)

of a component derived from p-(t-butoxy)styrene, 19% by mass of a component derived from styrene, and 80% by mass of a component derived from 1,3-butadiene.

(Copolymer (2))

Copolymer (2) was produced using the same recipe as that of copolymer (1), except that the amount of p-(t-butoxy)styrene used was changed to 5 mmol. The copolymer had a Mw of 490,000 and contained 0.6 mol % (1.61% by mass) of a component derived from p-(t-butoxy)styrene, 19% by mass of a component derived from styrene, and 79% by mass of a component derived from 1,3-butadiene.

(Copolymer (3))

Copolymer (3) was produced using the same recipe as that of copolymer (1), except that the p-(t-butoxy)styrene was replaced by adding 1 mmol of 3,4-dimethoxystyrene. The copolymer had a Mw of 470,000 and contained 0.1 mol % (0.30% by mass) of a component derived from 3,4-dimethoxystyrene, 19% by mass of a component derived from styrene, and 80% by mass of a component derived from 1,3-butadiene.

(Copolymer (4))

Copolymer (4) was produced using the same recipe as that of copolymer (1), except that the p-(t-butoxy)styrene was replaced by adding 5 mmol of 3,4-dimethoxystyrene. The copolymer had a Mw of 480,000 and contained 0.6 mol % (1.50% by mass) of a component derived from 3,4-dimethoxystyrene, 19% by mass of a component derived from styrene, and 79% by mass of a component derived from 1,3-butadiene.

Synthesis of 4-ethenyl-1,2-bis[(trimethylsilyl)oxy]-benzene

Into a sufficiently nitrogen-purged glass vessel were charged 200 mL of hexane and 1 mol of trimethylchlorosilane, and then a mixture of 1 mol of 3,4-dihydroxystyrene and 2 mol of triethylamine was dropwise added at a temperature of 40° C. or lower over two hours or longer while cooling on ice. After confirming the disappearance of any 3,4-dihydroxystyrene spot by TLC (thin-layer chromatography), the reaction solution was filtered through celite. Subsequently, the hexane was concentrated by a rotary evaporator. The resulting solution was passed through a silica gel column packed in hexane, and then the fraction containing only the largest spot was concentrated.

The concentrate was found to have an absolute molecular weight of 280 by LC-MS analysis, thereby identifying the purified product as 4-ethenyl-1,2-bis[(trimethylsilyl)oxy]benzene.

(Copolymer (5))

Copolymer (5) was produced using the same recipe as that of copolymer (1), except that the p-(t-butoxy)styrene was replaced by adding 1 mmol of 4-ethenyl-1,2-bis[(trimethylsilyl)oxy]benzene. The copolymer had a Mw of 460,000 and contained 0.1 mol % (0.51% by mass) of a component derived from 4-ethenyl-1,2-bis[(trimethylsilyl)oxy]benzene, 19% by mass of a component derived from styrene, and 80% by mass of a component derived from 1,3-butadiene.

(Copolymer (6))

Copolymer (6) was produced using the same recipe as that of copolymer (1), except that the p-(t-butoxy)styrene was replaced by adding 1 mmol of 3,4-dihydroxystyrene. The copolymer had a Mw of 620,000 and contained 0.1 mol % (0.25% by mass) of a component derived from 3,4-dihydroxystyrene, 19% by mass of a component derived from styrene, and 80% by mass of a component derived from 1,3-butadiene.

Synthesis of 4-ethenyl-1-(trimethylsilyl)oxy-2-methoxy-benzene

Into a sufficiently nitrogen-purged glass vessel were charged 200 mL of hexane and 0.5 mol of trimethylchlorosilane, and then a mixture of 1 mol of 3,4-dihydroxystyrene and 1 mol of triethylamine was dropwise added at 40° C. or lower over two hours or longer while cooling on ice. After confirming the disappearance of any 3,4-dihydroxystyrene spot by TLC (thin-layer chromatography), the reaction solution was filtered through celite. Subsequently, the hexane was concentrated by a rotary evaporator. The resulting solution was passed through a silica gel column packed in hexane, and then the fraction containing only the largest spot was concentrated.

Next, into a sufficiently nitrogen-purged glass vessel were charged 200 mL of hexane and 0.5 mol of dimethyl sulfate. Then, a mixture of the obtained concentrate and 1 mol of triethylamine was dropwise added at 40° C. or lower over two hours or longer. After confirming the disappearance of any spot from the concentrate by TLC (thin-layer chromatography), the reaction solution was filtered through celite. Subsequently, the hexane was concentrated by a rotary evaporator. The resulting solution was passed through a silica gel column packed in hexane, and then the fraction containing only the largest spot was concentrated.

The concentrate was found to have an absolute molecular weight of 222 by LC-MS analysis, thereby identifying the purified product as 4-ethenyl-1-(trimethylsilyl) oxy-2-methoxy-benzene.

(Copolymer (7))

Copolymer (7) was produced using the same recipe as that of copolymer (1), except that the p-(t-butoxy)styrene was replaced by adding 1 mmol of 4-ethenyl-1-(trimethylsilyl) oxy-2-methoxy-benzene. The copolymer had a Mw of 470,000 and contained 0.1 mol % (0.39% by mass) of a component derived from 4-ethenyl-1-(trimethylsilyl)oxy-2-methoxy-benzene, 19% by mass of a component derived from styrene, and 80% by mass of a component derived from 1,3-butadiene.

(Copolymer (8))

Copolymer (8) was produced using the same recipe as that of copolymer (1), except that the p-(t-butoxy)styrene was replaced by adding 1 mmol of 3,4-dimethoxystyrene, and the amounts of tetramethylethylenediamine and n-butyllithium used were changed to control the Mw. The copolymer had a Mw of 1000 and contained 0.1 mol % (0.3% by mass) of a component derived from 3,4-dimethoxystyrene, 19% by mass of a component derived from styrene, and 80% by mass of a component derived from 1,3-butadiene.

(Copolymer (9))

Copolymer (9) was produced using the same recipe as that of copolymer (1), except that the p-(t-butoxy)styrene was replaced by adding 1 mmol of 3,4-dimethoxystyrene, and the amounts of tetramethylethylenediamine and n-butyllithium used were changed to control the Mw. The copolymer had a Mw of 2,500,000 and contained 0.1 mol % (0.3% by mass) of a component derived from 3,4-dimethoxystyrene, 19% by mass of a component derived from styrene, and 80% by mass of a component derived from 1,3-butadiene.

(Copolymer (10))

Copolymer (10) was produced using the same recipe as that of copolymer (1), except that the p-(t-butoxy)styrene was replaced by adding 1 mmol of 3,4-dimethoxystyrene, and the amounts of tetramethylethylenediamine and n-butyllithium used were changed to control the Mw. The copolymer had a Mw of 800 and contained 0.1 mol % (0.3% by mass) of a component derived from 3,4-dimethoxystyrene, 19% by mass of a component derived from styrene, and 80% by mass of a component derived from 1,3-butadiene.

(Copolymer (11))

Copolymer (11) was produced using the same recipe as that of copolymer (1), except that the p-(t-butoxy)styrene was replaced by adding 1 mmol of 3,4-dimethoxystyrene, and the amounts of tetramethylethylenediamine and n-butyllithium used were changed to control the Mw. The copolymer had a Mw of 2,700,000 and contained 0.1 mol % (0.3% by mass) of a component derived from 3,4-dimethoxystyrene, 19% by mass of a component derived from styrene, and 80% by mass of a component derived from 1,3-butadiene.

The chemicals used in examples and comparative examples are described below.

NR: RSS #3
BR: Ubepol BR150B available from Ube Industries, Ltd.
SBR: SL574 available from JSR Corporation
Copolymers (1) to (11): synthesized as described above
Silica: ULTRASIL VN3 ($N_2SA$: 180 m$^2$/g) available from Evonik
Silane coupling agent: Si69 (bis(3-triethoxysilylpropyl)tetrasulfide) available from Evonik
Antioxidant: Nocrac 6C (N-(1,3-dimethylbutyl)-N'-phenyl-p-phenylenediamine) available from Ouchi Shinko Chemical Industrial Co., Ltd.
Stearic acid: stearic acid available from NOF Corporation
Zinc oxide: zinc oxide #1 available from Mitsui Mining & Smelting Co., Ltd.
Sulfur: sulfur powder available from Tsurumi Chemical Industry Co., Ltd.
Vulcanization accelerator (1): NOCCELER CZ (N-cyclohexyl-2-benzothiazolylsulfenamide) available from Ouchi Shinko Chemical Industrial Co., Ltd.
Vulcanization accelerator (2): NOCCELER D (1,3-diphenylguanidine) available from Ouchi Shinko Chemical Industrial Co., Ltd.

Examples and Comparative Examples

According to each formulation shown in Table 1, the materials other than the sulfur and vulcanization accelerators were kneaded using a 1.7 L Banbury mixer (Kobe Steel, Ltd.) at 150° C. for five minutes to give a kneaded mixture. Then, the kneaded mixture was kneaded with the sulfur and vulcanization accelerators in an open roll mill at 80° C. for five minutes to give an unvulcanized rubber composition. The unvulcanized rubber composition was press-vulcanized at 170° C. for 15 minutes to give a vulcanized rubber composition.

The vulcanized rubber compositions prepared as above were evaluated for the following properties. Table 1 shows the results.

(Fuel Economy)

The tan δ of the vulcanized rubber compositions was measured at a dynamic strain amplitude of 1%, a frequency of 10 Hz, and a temperature of 50° C. using a spectrometer available from Ueshima Seisakusho Co., Ltd. The reciprocals of the tan δ values are expressed as an index relative to Comparative Example 1 (=100). A higher index indicates a smaller rolling resistance and better fuel economy.

(Wet Grip Performance)

Wet grip performance was evaluated using a flat belt friction tester (FR5010 series) available from Ueshima Seisakusho Co., Ltd. Cylindrical rubber specimens (width: 20 mm, diameter: 100 mm) were prepared from the vulcanized rubber compositions. The slip ratio of the specimens on a road surface was changed from 0 to 70% at a speed of 20 km/hour, a load of 4 kgf, and a road surface temperature of 20° C., and then the maximum friction coefficient detected was read and expressed as an index relative to Comparative Example 1 (=100). A higher index indicates a higher maximum friction coefficient and better wet grip performance.

TABLE 1

| | | Comparative Example | | | | | Example | | | | | | | | | |
|---|---|---|---|---|---|---|---|---|---|---|---|---|---|---|---|---|
| | | 1 | 2 | 3 | 4 | 5 | 1 | 2 | 3 | 4 | 5 | 6 | 7 | 8 | 9 | 10 |
| Formulation (parts by mass) | NR | 20 | 20 | 20 | 20 | 20 | 20 | 20 | 20 | 20 | 20 | 20 | 20 | 20 | 20 | 20 |
| | BR | 10 | 10 | 10 | 10 | 10 | 10 | 10 | 10 | 10 | 10 | 10 | 10 | 10 | 10 | 10 |
| | SBR | 70 | 50 | 50 | 50 | 50 | 50 | 50 | 50 | 50 | 50 | 50 | 50 | 65 | 15 | — |
| | Copolymer (1) | — | 20 | — | — | — | — | — | — | — | — | — | — | — | — | — |
| | Copolymer (2) | — | — | 20 | — | — | — | — | — | — | — | — | — | — | — | — |
| | Copolymer (3) | — | — | — | — | — | 20 | — | — | — | — | — | 5 | 45 | 70 | |
| | Copolymer (4) | — | — | — | — | — | — | 20 | — | — | — | — | — | — | — | — |
| | Copolymer (5) | — | — | — | — | — | — | — | 20 | — | — | — | — | — | — | — |
| | Copolymer (6) | — | — | — | — | — | — | — | — | 20 | — | — | — | — | — | — |
| | Copolymer (7) | — | — | — | — | — | — | — | — | — | 20 | — | — | — | — | — |
| | Copolymer (8) | — | — | — | — | — | — | — | — | — | — | 20 | — | — | — | — |
| | Copolymer (9) | — | — | — | — | — | — | — | — | — | — | — | 20 | — | — | — |
| | Copolymer (10) | — | — | — | 20 | — | — | — | — | — | — | — | — | — | — | — |
| | Copolymer (11) | — | — | — | — | 20 | — | — | — | — | — | — | — | — | — | — |
| | Silica | 60 | 60 | 60 | 60 | 60 | 60 | 60 | 60 | 60 | 60 | 60 | 60 | 60 | 60 | 60 |
| | Silane coupling agent | 6 | 6 | 6 | 6 | 6 | 6 | 6 | 6 | 6 | 6 | 6 | 6 | 6 | 6 | 6 |
| | Antioxidant | 1 | 1 | 1 | 1 | 1 | 1 | 1 | 1 | 1 | 1 | 1 | 1 | 1 | 1 | 1 |
| | Stearic acid | 2 | 2 | 2 | 2 | 2 | 2 | 2 | 2 | 2 | 2 | 2 | 2 | 2 | 2 | 2 |
| | Zinc oxide | 3 | 3 | 3 | 3 | 3 | 3 | 3 | 3 | 3 | 3 | 3 | 3 | 3 | 3 | 3 |
| | Sulfur | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| | Vulcanization accelerator (1) | 1 | 1 | 1 | 1 | 1 | 1 | 1 | 1 | 1 | 1 | 1 | 1 | 1 | 1 | 1 |
| | Vulcanization accelerator (2) | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| Evaluation | Fuel economy index | 100 | 108 | 110 | 91 | 103 | 115 | 119 | 115 | 114 | 115 | 111 | 111 | 112 | 119 | 125 |
| | Wet grip performance index | 100 | 108 | 110 | 112 | 91 | 117 | 118 | 115 | 117 | 116 | 115 | 115 | 114 | 121 | 129 |

Table 1 shows that the examples containing a copolymer obtained by copolymerizing an aromatic vinyl compound, a conjugated diene compound, and a compound of formula (1) or by copolymerizing a conjugated diene compound and a compound of formula (1), and having a weight average molecular weight of $1.0 \times 10^3$ to $2.5 \times 10^6$ exhibited better overall performance in terms of fuel economy and wet grip performance (expressed as the sum of the property indexes) than that of the comparative examples.

The invention claimed is:

1. A copolymer, obtained by copolymerizing an aromatic vinyl compound, a conjugated diene compound, and a compound represented by the formula (1) below or by copolymerizing a conjugated diene compound and a compound represented by the formula (1) below, the copolymer having a weight average molecular weight of $1.0 \times 10^3$ to $2.5 \times 10^6$,

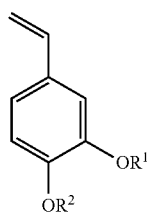

(1)

wherein $R^1$ and $R^2$ may be the same or different and each represents a functional group containing at least two selected from the group consisting of carbon, hydrogen, and silicon, and $R^1$ and $R^2$ may be joined together to form a ring structure.

2. The copolymer according to claim 1, wherein the copolymer comprises 0.05 to 35% by mass of a component derived from the compound of formula (1).

3. The copolymer according to claim 1, wherein the copolymer comprises 5 to 55% by mass of a component derived from the aromatic vinyl compound.

4. The copolymer according to claim 1, wherein the copolymer comprises 40 to 90% by mass of a component derived from the conjugated diene compound.

5. A rubber composition, comprising the copolymer according to claim 1.

6. The rubber composition according to claim 5, wherein the rubber composition comprises, based on 100% by mass of a rubber component therein, 5% by mass or more of the copolymer.

7. The rubber composition according to claim 5, wherein the rubber composition comprises, per 100 parts by mass of a rubber component therein, 5 to 150 parts by mass of silica.

8. A tire, comprising a tire component comprising the rubber composition according to claim 5.

* * * * *